United States Patent
Lee et al.

(10) Patent No.: US 12,183,119 B2
(45) Date of Patent: Dec. 31, 2024

(54) FACE IDENTIFICATION USING MILLIMETER-WAVE RADAR SENSOR DATA

(71) Applicant: Bitsensing Inc., Seoul (KR)

(72) Inventors: Jae-Eun Lee, Seoul (KR); Haesueng Lim, Sung-nam si (KR); Seongwook Lee, Seoul (KR)

(73) Assignee: Bitsensing Inc., Seoul (KR)

( * ) Notice: Subject to any disclaimer, the term of this patent is extended or adjusted under 35 U.S.C. 154(b) by 438 days.

(21) Appl. No.: 17/575,512

(22) Filed: Jan. 13, 2022

(65) Prior Publication Data

US 2022/0327863 A1 Oct. 13, 2022

Related U.S. Application Data

(63) Continuation-in-part of application No. 17/229,529, filed on Apr. 13, 2021.

(60) Provisional application No. 63/173,711, filed on Apr. 12, 2021.

(51) Int. Cl.
| | |
|---|---|
| G06K 9/00 | (2022.01) |
| G01S 13/34 | (2006.01) |
| G01S 13/89 | (2006.01) |
| G06V 10/82 | (2022.01) |
| G06V 40/16 | (2022.01) |

(52) U.S. Cl.
CPC ............ *G06V 40/172* (2022.01); *G01S 13/34* (2013.01); *G01S 13/89* (2013.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2019/0011534 | A1* | 1/2019 | Trotta | G01S 13/89 |
| 2020/0025877 | A1* | 1/2020 | Sarkis | G01S 7/412 |
| 2020/0143563 | A1* | 5/2020 | Liu | G06V 20/56 |
| 2021/0182589 | A1* | 6/2021 | Kim | G06T 7/10 |
| 2022/0012465 | A1* | 1/2022 | Yuan | G06V 10/764 |

* cited by examiner

*Primary Examiner* — S J Park
(74) *Attorney, Agent, or Firm* — Dinsmore & Shohl LLP; Yongsok Choi, Esq.

(57) ABSTRACT

Facial identification of subjects using a millimeter wave radar sensor, including: transmitting a radar signal onto faces of subjects using the millimeter wave radar sensor; receiving and accumulating reflected radar data, wherein the reflected radar data is received from channels of multiple receiving antennas; converting the reflected radar data into an image form suitable as an input to a convolutional neural network; and performing the facial identification on the image form using a classifier trained by the convolutional neural network.

20 Claims, 5 Drawing Sheets

FACE IDENTIFICATION USING MILLIMETER-WAVE RADAR SENSOR DATA

CROSS-REFERENCE TO RELATED APPLICATIONS

This application is a continuation-in-part application of U.S. patent application Ser. No. 17/229,529, filed Apr. 13, 2021, entitled "DNN-Based Human Face Classification." This application also claims the benefit of priority under 35 U.S.C. § 119(e) of U.S. Provisional Patent Application No. 63/173,711, filed Apr. 12, 2021, entitled "Face Identification using Millimetre-Wave Radar Sensor Data." The disclosures of the above-referenced application are incorporated herein by reference.

BACKGROUND

Field of the Invention

The present disclosure relates to using radar sensors, and more specifically, to perform facial identification using radar sensor data.

Background

Radar sensors have been used traditionally to estimate target distance and velocity information. However, in recent years, the radar sensors have been used in more diverse fields. For example, a radar sensor may be mounted on a vehicle and used for autonomous driving.

SUMMARY

The present disclosure describes facial identification of subjects using a millimeter wave radar sensor.

In one implementation, a method for facial identification of subjects using a millimeter wave radar sensor is disclosed. The method includes: transmitting a radar signal onto faces of subjects using the millimeter wave radar sensor; receiving and accumulating reflected radar data, wherein the reflected radar data is received from channels of multiple receiving antennas; converting the reflected radar data into an image form suitable as an input to a convolutional neural network; and performing the facial identification on the image form using a classifier trained by the convolutional neural network.

In one implementation, the millimeter wave radar sensor includes a frequency-modulated continuous-wave radar sensor. In one implementation, the frequency-modulated continuous-wave radar sensor is configured with an operating center frequency of 61 GHz and a bandwidth of 6 GHz. In one implementation, converting the reflected radar data into an image form includes synthesizing in parallel the reflected radar data received from the channels of the multiple receiving antennas using fast Fourier Transform. In one implementation, the classifier uses only the radar data around the faces of the subjects. In one implementation, the convolutional neural network includes: a predetermined number of convolutional layers; and a predetermined number of fully-connected layers, wherein the predetermined number is determined by a number of the faces of the subjects to identify. In one implementation, each of the predetermined number of convolutional layers performs n×n convolutions, wherein n=the predetermined number. In one implementation, the method further includes flattening features of a last layer of the predetermined number of convolutional layers by at least one fully-connected layer.

In another implementation, a system to identify faces of subjects is disclosed. The system includes: at least one transmitting antenna to transmit a radar signal onto faces of subjects; a plurality of receiving antenna elements to receive and accumulate reflected radar data; and a digital signal processor to convert the reflected radar data into an image form suitable as an input to a convolutional neural network, the digital signal processor to perform the facial identification on the image form using a classifier trained by the convolutional neural network.

In one implementation, the system is a frequency-modulated continuous wave (FMCW) radar sensor. In one implementation, the FMCW radar sensor is configured as a millimeter wave radar sensor with a center frequency of 61 GHz and a bandwidth of 6 GHz. In one implementation, the system is configured with one transmitting antenna and three receiving antenna elements, wherein two receiving antenna elements are placed in a horizontal direction, whale two receiving antenna elements are placed in a vertical direction, with one receiving antenna element is shared in the horizontal and vertical directions. In one implementation, the system further includes a waveform generator to transmit a waveform whose frequency increases linearly. In one implementation, the convolutional neural network includes: a predetermined number of convolutional layers; and a predetermined number of fully-connected layers, wherein the predetermined number is determined by a number of the faces of the subjects to identify.

In another implementation, a non-transitory computer-readable storage medium storing a computer program to identify faces of subjects is disclosed. The computer program includes executable instructions that cause a computer to: command transmission of a radar signal onto faces of subjects using a millimeter wave radar sensor; receive and accumulate reflected radar data, wherein the reflected radar data is received from channels of multiple receiving antennas; convert the reflected radar data into an image form suitable as an input to a convolutional neural network; and perform facial identification on the image form using a classifier trained by the convolutional neural network.

In one implementation, the executable instructions that cause the computer to convert the reflected radar data into an image form includes executable instruction that cause the computer to synthesize in parallel the reflected radar data received from the channels of the multiple receiving antennas using fast Fourier Transform. In one implementation, the classifier uses only the radar data around the faces of the subjects. In one implementation, the convolutional neural network includes: a predetermined number of convolutional layers; and a predetermined number of fully-connected layers, wherein the predetermined number is determined by a number of the faces of the subjects to identify. In one implementation, each of the predetermined number of convolutional layers performs n×n convolutions, wherein n=the predetermined number. In one implementation, the computer-readable storage medium further includes executable instructions that cause the computer to flatten features of a last layer of the predetermined number of convolutional layers by at least one fully-connected layer.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. is a diagram illustrating a structure of the CNN used for facial identification in accordance with one implementation of the present disclosure;

FIG. 5E shows the result of applying the t-SNE algorithm to the output vector, which is obtained from the last layer of the proposed CNN model.

DETAILED DESCRIPTION

As stated above, the radar sensor may be mounted on a vehicle and used for autonomous driving. The radar sensor may also be used to: acquire biometric information such as respiratory and/or heart rates of a person; and monitor people indoors. Since radar sensors, unlike image-based sensors (e.g., camera sensors), maintain effective performance even in the dark, the radar sensors can provide more privacy protection compared to the image-based sensors. Since the radar sensors use higher-frequency bands such as a millimeter-wave band, miniaturization of the radar sensors can be rapidly achieved. Moreover, the position of people inside a vehicle can be determined using a small-sized ultra-wide-band (UNE) radar sensor.

In some implementations, the radar sensors can be used for target recognition/identification, as well as target detection and tracking. Machine learning techniques can be applied to radar sensor data to achieve high-performance target recognition and classification with radar sensors. In some cases, pedestrians, cyclists, and vehicles can be classified by applying the support vector machine to automotive radar sensor data. Further, the artificial neural network can be applied to the radar data to classify the types of drones.

Certain implementations of the present disclosure provide for classifying human faces using a small-sized millimeter wave radar sensor. In one implementation, the radar sensor transmits a frequency-modulated continuous waveform (e.g., operating in the 61 GHz band) and receives reflected signals using spatially separated receiving antenna elements. Since the shape and composition of the human face varies from person to person, the reflection characteristics of the radar signal can be distinguished from each other. Using signals received from multiple antenna elements, the deep neural network (DNN) can be trained for human face classification. When training the DNN with actual radar signals, multiple human faces can be classified with high accuracy.

After reading these descriptions, it will become apparent how to implement the disclosure in various implementations and applications. However, although various implementations of the present disclosure will be described herein, it is to be understood that these implementations are presented by way of example only, and not limitation. As such, this detailed description of various implementations should not be construed to limit the scope or breadth of the present disclosure.

In one implementation, a method for facial identification of subjects using a combination of radar sensor data and machine learning techniques is disclosed. The method uses a frequency-modulated continuous wave (FMCW) radar sensor that utilizes a center frequency of approximately 61 GHz (with a range of about 5-10 GHz around 61 GHz) and a bandwidth of about 6±1 GHz. Since the FMCW method has a high pulse compression ratio, it has the advantage of better range resolution than other modulation techniques. The radar data is accumulated by transmitting and receiving radar signals on faces of the subjects (e.g., humans). An appropriate classifier for facial identification is then designed by training a convolutional neural network (CNN) based on the accumulated radar sensor data to distinguish radar signals reflected from different faces. Since the CNN uses an image as an input format, it is necessary to convert the radar signals into the form of an image. Thus, signals received from multiple antenna elements are synthesized in parallel to convert the radar signals into an image that is in the input format to train the CNN. The classification performance of the CNN trained with the radar image data is then collected and evaluated. As the data shows, the accuracy of the facial identification using the CNN is measured to be greater than 98%. The radar data was also collected when the same subjects wore cotton masks. The data shows that wearing a mask does not significantly affect the accuracy of the radar-based facial identification method.

Figure 1:
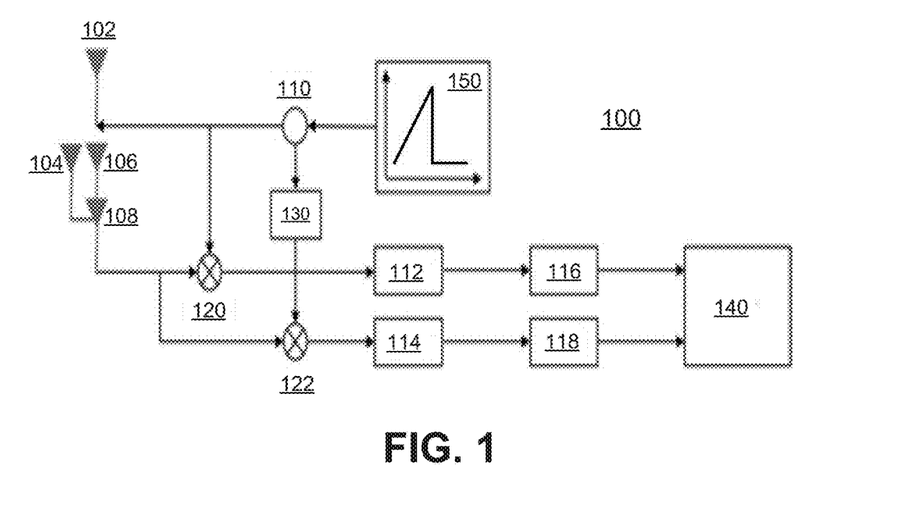
FIG. 1 is a block diagram of a radar sensor used for facial identification of subjects in accordance with one implementation of the present disclosure.
Figure 2:
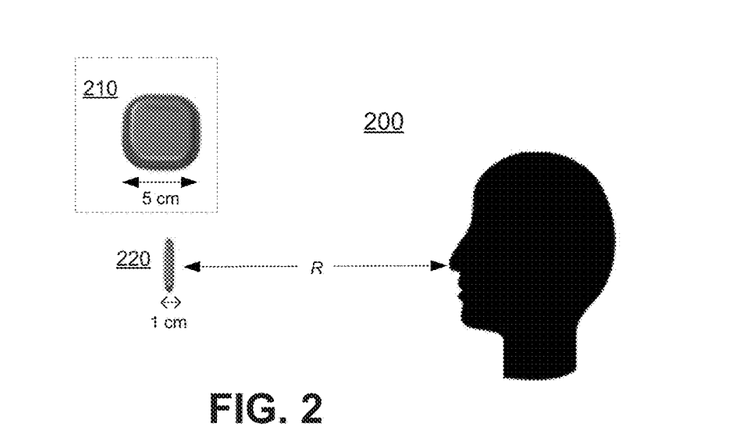
FIG. 2 is a diagram illustrating an experimental environment for radar sensor data collection in accordance with one implementation of the present disclosure.

The present disclosure presents the method for facial identification of subjects in the following order with the description of: (a) The configuration of a radar sensor (FIG. 1); (b) The experimental environment for radar sensor data collection (FIG. 2); (c) The image data genera-ion to train the CNN (FIG. 3); and (d) The structure of the CNN used for facial identification (FIG. 4). The results of the experiment are shown in Tables 1 and 2, as well as FIGS. 5A and 5B.

FIG. 1 is a block diagram of a radar sensor 100 used for facial identification of subjects in accordance with one implementation of the present disclosure. In one implementation, the radar sensor 100 is configured as a millimeter wave radar sensor. In a particular implementation, the radar sensor 100 is configured as an FMCW radar sensor with a center frequency of $C_f$ and a bandwidth of B. In one implementation, the center frequency is approximately 61 GHz and the bandwidth is about 6 GHz.

In the illustrated implementation of FIG. 1, the FMCW radar sensor 100 includes one transmitting antenna 102 and three receiving antenna elements 104-108 in a 1×3 antenna configuration. In other implementations, the radar sensor 100 is configured with any number of transmitting antennas and any number of receiving antenna elements. In the illustrated implementation of FIG. 1, two receiving antenna elements 104, 106 are placed in the horizontal direction, while two receiving antenna elements 106, 108 are placed in the vertical direction. Thus, the antenna element 106 is shared. The spacing between adjacent antenna elements is $$\frac{c}{2f_c},$$

where c is the speed of light and $f_c$ is the center frequency. The FMCW radar sensor 100 also includes a voltagecontrolled oscillator (VCO) 110, low-pass filters (LPFs) 112, 114, analog-to-digital converters (ADCs) 116, 118, mixers 120, 122, a phase shifter 130, a digital signal processor (DSP) 140, and a waveform generator 150.

In one implementation, the waveform generator 150 transmits a waveform whose frequency increases linearly. Thus, in one implementation, the FMCW radar sensor 100 increases the bandwidth B by 6 GHz for 12.5 milliseconds, and the range resolution (Δr) becomes 2.5 cm (i.e., $$\Delta r = \frac{c}{2B}).$$

In this implementation, the period of the waveform is defined as one frame.

FIG. 2 is a diagram illustrating an experimental environment 200 for radar sensor data collection in accordance with one implementation of the present disclosure. As shown in FIG. 2, experiments were conducted with the radar sensor (top view 210, side view 220) laced a predetermined distance (R) away from the center of the face. In one implementation, the radar sensor 210 is configured as a square with the width and length measured about 5 cm. In one implementation, R is 30 cm. The radar sensor data was collected while maintaining the same experimental conditions for three different subjects. Further, the radar data was also obtained for each subject wearing a cotton mask. A total of 12,000 frames of radar signals were collected for three subjects with and without cotton masks.

Figure 3:
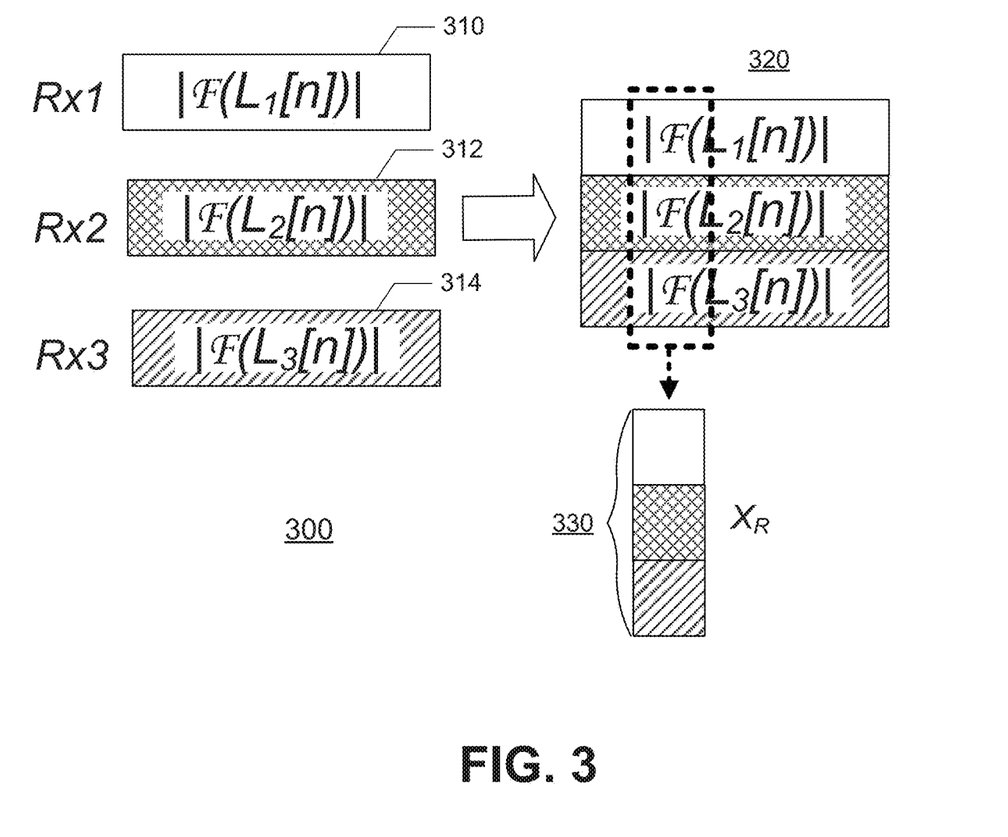
FIG. 3 is a diagram illustrating an image data generation process for training the CNN in accordance with one implementation of the present disclosure.
Figure 4:
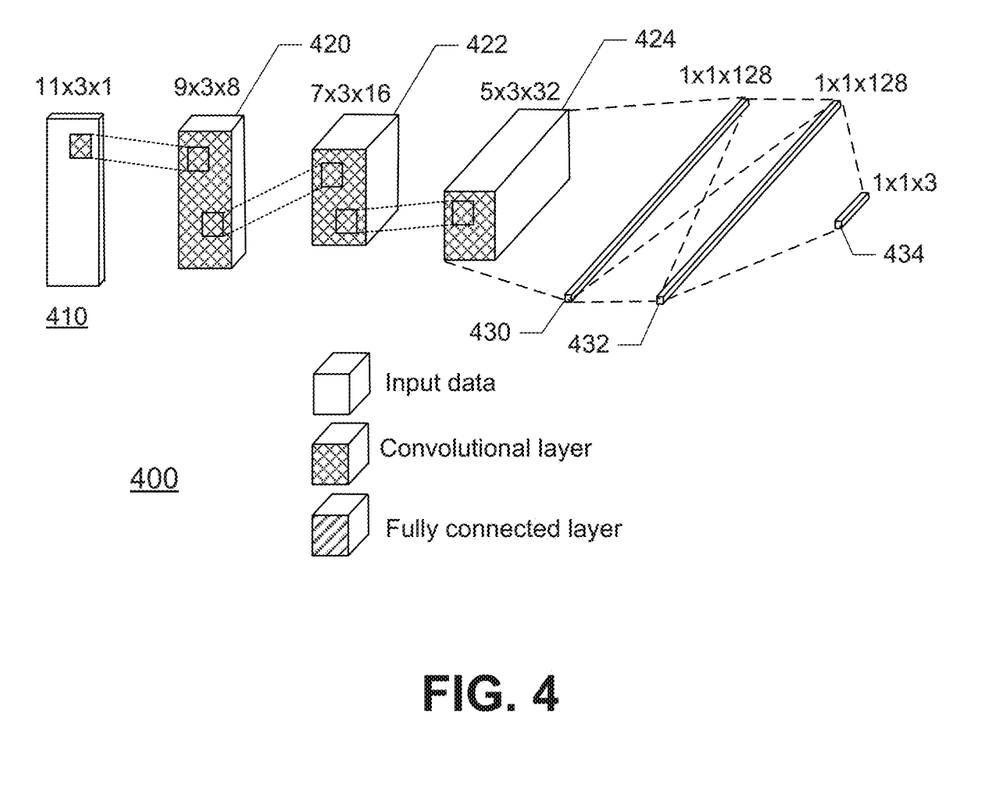

FIG. 3 is a diagram illustrating an image data generation process 300 for training the CNN in accordance with one implementation of the present disclosure. Since the CNN is a widely used network for classifying multiple images, the radar signals need to be converted into an appropriate image format as an input to the CNN. Therefore, in one implementation, the radar signals 310, 312, 314 received from multiple receiving channels are synthesized in parallel to form an image 320. That is, in one implementation, the input image data generated from the radar signal can be expressed as $$X = \begin{bmatrix} |F(L_1[n])| \\ |F(L_2[n])| \\ \vdots \\ |F(L_I[n])| \end{bmatrix},$$

where $\mathcal{F}(L_i[t])$ denotes the fast Fourier transform (FFT) result of the time-sampled low-pass filter (LPF) output in the $i_{th}$ (i=1, 2, . . . , I) receiving channel.

In one implementation, three receiving antenna elements and a $2^{10}$-point EFT are used to generate 3×1024-sized image data. With the FMCW radar sensor, it is more effective to use the FFT-applied signals than the time-domain signals, since the distance between the radar and the target can be easily calculated using the frequency-domain signal. Since only the signals around the face are needed for learning, the full image (X) is not needed. Therefore, only the signals around the face are cut off and used, which is expressed as a refined input ($X_R$) 330.

In one particular implementation, the size of $X_R$ 330 is set to 3×11, which means that R−12.5 cm to R+12.5 cm is the region of interest around the face. That is, only the detection result of about 12.5 cm before and after the face position. (R) is used as the input of the network.

FIG. 4 is a diagram illustrating a structure 400 of the CNN used for facial identification in accordance with one implementation of the present disclosure. In the illustrated implementation of FIG. 4, three convolutional layers 420, 422, 424 and three fully-connected layers 430, 432, 434 are used in the network. In some implementations where more than 3 subjects' faces are to be identified, the number of convolutional layers and fully-connected layers can be expanded to match the number of subjects.

In the illustrated implementation of FIG. 4, the layer 420 is coupled to input data 410. In each convolutional layer, 3×3 convolutions are conducted, followed by the rectified linear unit activation and batch normalization. The features of the last convolutional layer 424 are then flattened by two fully-connected layers 430, 432. In one implementation, dropout layers with a dropout rate of 0.25 may be added after two fully-connected layers 430, 432. In one implementation, another fully-connected layer 434 may be added to give a vector of size 1×1×3. Finally, the loss of the model using the cross-entropy is calculated. In a particular implementation, the parameters of the CNN model are set as follows: (a) the stochastic gradient descent momentum algorithm is used for updating parameters; (b) the size of the mini-batch is set to 8; and (c) the learning rate is set to $10^{-4}$, and the epoch is set to 20.

In one implementation, the CNN is trained with radar signals acquired from three subjects. To prevent bias to the classifier, the network is trained using only 70% of the total data (rather than all of the acquired data). Also, 15% of the total data is used for the validation set. The performance of the classifier is then verified using the remaining 15% of the data. The classification results with the subjects not wearing masks are given in Table 1. As shown in Table 1, the average identification result for the three faces is about 98.7%.

TABLE 1

| Actual class/<br>Estimated class | Face 1, % | Face 2, % | Face 3, % |
|---|---|---|---|
| face 1 | 97.3 | 2.7 | 0.0 |
| face 2 | 1.3 | 98.7 | 0.0 |
| face 3 | 0.0 | 0.0 | 100.0 |

In another implementation, the CNN is trained by adding the radar data obtained with each subject wearing a cotton mask. In this implementation, the classification performance of the newly-trained network is given in Table 2.

TABLE 2

| Actual class/<br>Estimated class | Face 1, % | Face 2, % | Face 3, % |
|---|---|---|---|
| face 1 | 96.7 | 2.0 | 1.3 |
| face 2 | 0.7 | 96.7 | 2.7 |
| face 3 | 0.0 | 0.0 | 100.0 |

In comparing the identification results between Table 1 (subjects not wearing masks) and Table 2 (subjects wearing masks), the average classification accuracy decreased by 0.9% when the subjects wore masks. Therefore, the performance of the radar-based facial identification method did not severely deteriorate with the subjects wearing masks.

Figure 5A:
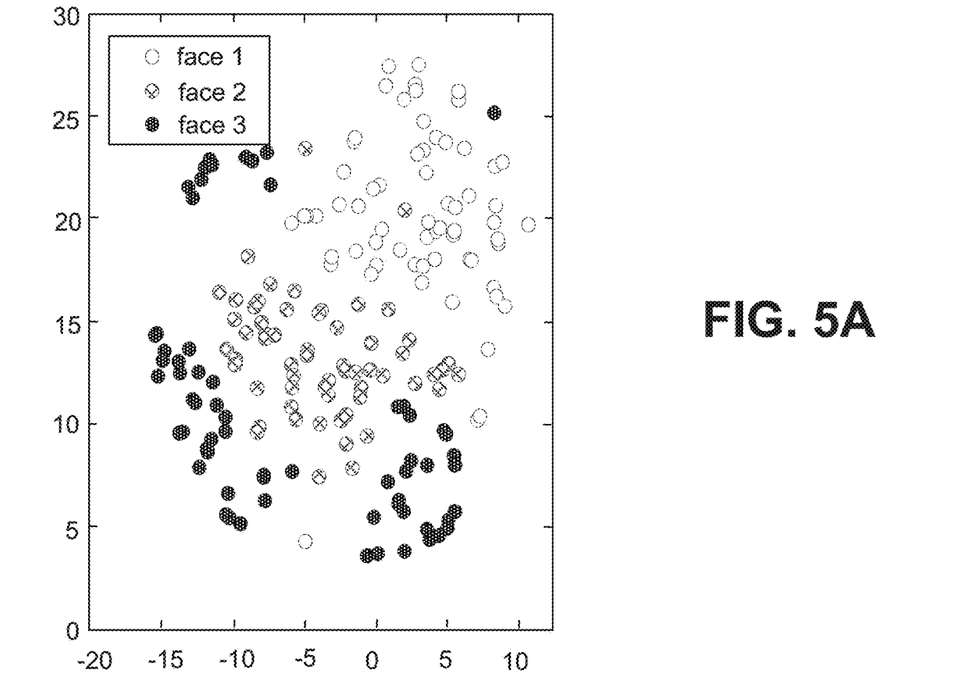
FIG. 5A shows the result of applying the t-SNE algorithm to the input image $X_R$ in accordance with one implementation of the present disclosure.
Figure 5B:
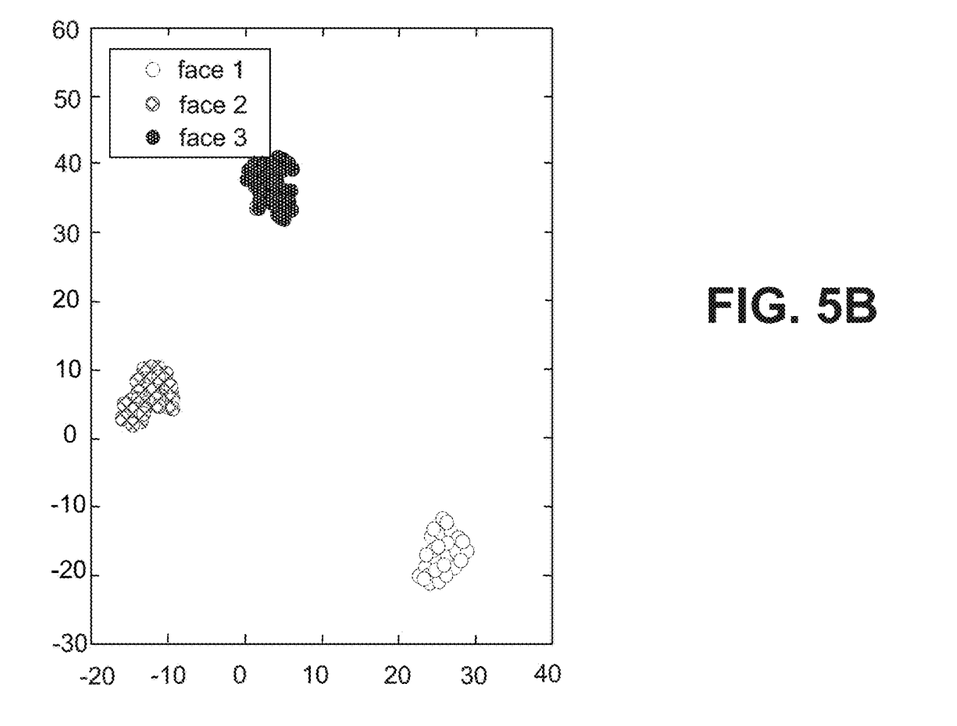

FIGS. 5A and 5B show graphical illustrations of the classification performance of the CNN model in accordance with one implementation of the present disclosure. In the illustrated implementation of FIGS. 5A and 5B, the classification performance of the CNN model is verified with the t-stochastic neighbor embedding (t-SNE) algorithm, which can visualize the high-dimensional data by performing dimensionality reduction. That is, the algorithm preserves the similarity of the original data even if the dimension is reduced into two or three dimensions. Therefore, with the t-SNE algorithm, the similarity of the original data can be observed in 2-D scatter plot.

FIG. 5A shows the result of applying the t-SNE algorithm to the input image $X_R$ in accordance with one implementation of the present disclosure. As shown in FIG. 5A, the samples from each class are not clustered together but are widely distributed.

FIG. 5B shows the result of applying the t-SNE algorithm to the output vector, which is obtained from the last layer of the proposed CNN model. In comparing FIG. 5A and FIG. 5B, the embedded data of each class are located closer to each other in FIG. 5E. Therefore, it can be seen that the proposed classification model effectively extracts features from the input face data.

Figure 6:
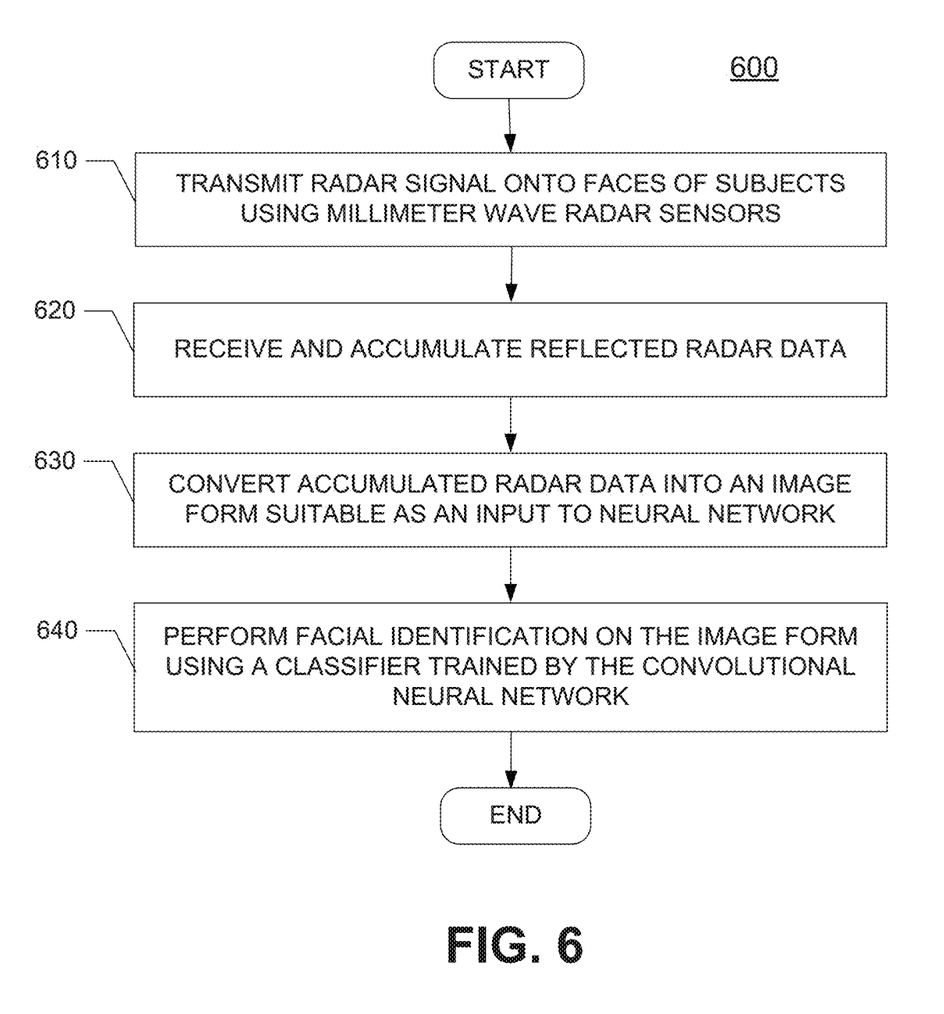
FIG. 6 is a flow diagram of a method for facial identification of subjects in accordance with one implementation of the present disclosure.

FIG. 6 is a flow diagram of a method 600 for facial identification of subjects in accordance with one implementation of the present disclosure. In one implementation, the method 600 uses a combination of radar sensor data and machine learning techniques. Thus, the facial identification is performed by applying the CNN to the millimeter-wave radar sensor data.

In the illustrated implementation of FIG. 6, a radar signal is transmitted, at step 610, onto faces of subjects using millimeter wave radar sensors. In one implementation, the millimeter wave radar sensor includes a frequency-modulated continuous-wave (FMCW) radar sensor with an operating center frequency of approximately 61 GHz and a bandwidth of about 6 GHz. Reflected radar data is received and accumulated, at step 620. The accumulated radar data is then converted into an image form suitable as an input to a neural network, at step 630, to train a classifier. In one implementation, the radar data received from multiple receiving channels are synthesized in parallel using fast Fourier Transform (EFT) to form the image suitable as an input to the neural network. In one implementation, the neural network is a convolutional neural network (CNN).

In the illustrated implementation of FIG. 6, facial identification on the reflected radar data is performed, at step 640, using a classifier trained by the convolutional neural network. As indicated before, the classifier is trained based on the accumulated radar sensor data. In some cases, only the signals around the face are cut off and used, because only the signals around the face are needed for learning. In one implementation, a plurality of convolutional layers and a plurality of fully-connected layers are used in the neural network. The number of layers to configure depends on the number of subjects to identify.

In one implementation, the first convolutional layer receives the input data, and n×n convolutions are conducted for each convolutional layer, where n represents the number convolutional layers. This is followed by rectified linear unit activation and batch normalization. The features of the last convolutional layer are then flattened by a predetermined number of fully-connected layers. In one implementation, dropout layers with a predetermined dropout rate may be added after the predetermined number of fully-connected layers.

In one implementation, the facial identification system 100 is configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 100 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, radar sensors and methods described in the present disclosure may be used to: (a) acquire biometric information such as respiratory and/or heart rates of a person; (b) monitor people indoors; (c) classify pedestrians, cyclists, and vehicles by applying the support vector machine to automotive radar sensor data; and (d) apply the artificial neural network to the radar data to classify the types of drones. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. Further, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for facial identification of subjects using a millimeter wave radar sensor, the method comprising:
transmitting a radar signal onto faces of subjects using the millimeter wave radar sensor;
receiving and accumulating reflected radar data, wherein the reflected radar data is received from channels of multiple receiving antennas;
converting the reflected radar data into an image form as an input to a convolutional neural network; and
performing the facial identification on the image form using a classifier trained by the convolutional neural network,
wherein the convolutional neural network comprises:
a first number of convolution layers; and
wherein the first number is determined by a number of the faces of the subjects to identify.

2. The method of claim 1,
wherein the millimeter wave radar sensor includes a frequency-modulated continuous-wave radar sensor.

3. The method of claim 2,
wherein the frequency-modulated continuous-wave radar sensor is configured with an operating center frequency of 61 GHz and a bandwidth of 6 GHz.

4. The method of claim 1,
wherein converting the reflected radar data into an image form comprises synthesizing in parallel the reflected radar data received from the channels of the multiple receiving antennas using fast Fourier Transform.

5. The method of claim 1,
wherein the classifier uses only the radar data around the faces of the subjects.

6. The method of claim 1,
wherein the convolutional neural network further comprises:
a second number of fully-connected layers,
wherein the second number is determined by a number of the faces of the subjects to identify.

7. The method of claim 6,
wherein each of the first number of convolutional layers performs n×n convolutions, wherein n=the first number.

8. The method of claim 7, further comprising
flattening features of a last layer of the first number of convolutional layers by at least one fully-connected layer.

9. A system to identify faces of subjects, comprising:
at least one transmitting antenna to transmit a radar signal onto faces of subjects;
a plurality of receiving antenna elements to receive and accumulate reflected radar data; and
a digital signal processor to convert the reflected radar data into an image form as an input to a convolutional neural network,
the digital signal processor to perform the facial identification on the image form using a classifier trained by the convolutional neural network,
wherein the convolutional neural network comprises:
a first number of convolutional layers, and
wherein the first number is determined by a number of the faces of the subjects to identify.

10. The system of claim 9,
wherein the system is a frequency-modulated continuous wave (FMCW) radar sensor.

11. The system of claim 10,
wherein the FMCW radar sensor is configured as a millimeter wave radar sensor with a center frequency of 61 GHz and a bandwidth of 6 GHz.

12. The system of claim 9,
wherein the system is configured with one transmitting antenna and three receiving antenna elements,
wherein two receiving antenna elements are placed in a horizontal direction, while two receiving antenna elements are placed in a vertical, direction, with one receiving antenna element is shared in the horizontal and vertical directions.

13. The system of claim 9, further comprising
a waveform generator to transmit a waveform whose frequency increases linearly.

14. The system of claim 9,
wherein the convolutional neural network further comprises:
a second number of fully-connected layers,
wherein the second number is determined by a number of the faces of the subjects to identify.

15. A non-transitory computer-readable storage medium storing a computer program to identify faces of subjects, the computer program comprising executable instructions that cause a computer to:
command transmission of a radar signal onto faces of subjects using a millimeter wave radar sensor;
receive and accumulate reflected radar data, wherein the reflected radar data is received from channels of multiple receiving antennas;
convert the reflected radar data into an image form as an input to a convolutional neural network; and
perform facial identification on the image form using a classifier trained by the convolutional neural network,
wherein the convolutional neural network comprises:
a first number of convolutional layer, and
wherein the first number is determined by a number of the faces of the subjects to identify.

16. The computer-readable storage medium of claim 15,
wherein the executable instructions that cause the computer to convert the reflected radar data into an image form comprises executable instruction that cause the computer to
synthesize in parallel the reflected radar data received from the channels of the multiple receiving antennas using fast Fourier Transform.

17. The computer-readable storage medium of claim 15,
wherein the classifier uses only the radar data around the faces of the subjects.

18. The computer-readable storage medium of claim 15,
wherein the convolutional neural network further comprises:
a second number of fully-connected layers,
wherein the second number is determined by a number of the faces of the subjects to identify.

19. The computer-readable storage medium of claim 18,
wherein each of the first number of convolutional layers performs n×n convolutions,
wherein n=the first number.

20. The computer-readable storage medium of claim 19, further comprising executable instructions that cause the computer to
flatten features of a last layer of the first number of convolutional layers by at least one fully-connected layer.

* * * * *